United States Patent
Liang et al.

(10) Patent No.: US 7,310,718 B1
(45) Date of Patent: Dec. 18, 2007

(54) METHOD FOR ENABLING COMPREHENSIVE PROFILING OF GARBAGE-COLLECTED MEMORY SYSTEMS

(75) Inventors: Sheng Liang, Cupertino, CA (US); Steffen Grarup, Palo Alto, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 0 days.

(21) Appl. No.: 09/856,779

(22) PCT Filed: Nov. 24, 1999

(86) PCT No.: PCT/US99/28089

§ 371 (c)(1),
(2), (4) Date: Oct. 3, 2001

(87) PCT Pub. No.: WO00/33192

PCT Pub. Date: Jun. 8, 2000

(51) Int. Cl.
*G06F 12/00* (2006.01)

(52) U.S. Cl. .......................................... 711/170; 718/1
(58) Field of Classification Search .................. 718/1
See application file for complete search history.

(56) References Cited

U.S. PATENT DOCUMENTS

| | | | |
|---|---|---|---|
| 5,193,180 | A | 3/1993 | Hastings |
| 5,621,912 | A | 4/1997 | Krol et al. |
| 6,047,125 | A | 4/2000 | Agesen et al. |
| 6,058,457 | A | 5/2000 | Tremblay et al. |
| 6,532,531 | B1 | 3/2003 | O'Connor et al. |

FOREIGN PATENT DOCUMENTS

| | | |
|---|---|---|
| EP | 0777181 | 6/1997 |
| WO | WO 9848353 | 10/1998 |

OTHER PUBLICATIONS

Java Virtual Machine Profiler Interface (JVMPI). Last modified Nov. 11, 1998, pp. 18-50.*
A. Beguelin, et al., "Recent Enhancements to PVM," 3HE International Journal of Supercomputer Applications and High Performance Computing, US, MIT Press, vol. 9, No. 2, Jun. 1, 1995, pp. 108-127.
"Memory Allocation Monitoring Class," IBM Technical Disclosure Bulletin, US IBM Corp. New York, vol. 37, No. 4A, Apr. 1, 1994, p. 445.
Rosenberg, Jonathan B., How Debuggers Work, Wiley Computer Publishing, pp. 180-182 (1996).
Liang et al., Comprehensive Profiling Support in the Java Virtual Machine, USENIX Association, 5th USENIX Conf. on Object-Oriented Technologies and Systems (COOTS '99) (May 1999).
Spencer, Gordon, "JDK 1.2: Immature, but tons of new abilities," JavaWorld, Inc. (Jan. 1, 1998).
Office Action dated Jun. 28, 2007, from United States Patent and Trademark Office for U.S. Appl. No. 10/758,266.

* cited by examiner

*Primary Examiner*—Brian R. Peugh
(74) *Attorney, Agent, or Firm*—Finnegan, Henderson, Farabow, Garrett & Dunner, L.L.P.

(57) ABSTRACT

A method and apparatus for profiling a heap. According to the method, a flexible and comprehensive general-purpose profiling interface that uniformly accommodates a wide variety of memory allocation and garbage collection methods is used. The profiling interface, among other things, employs a set of virtual machine profiling interface events that support all known types of garbage collection methods.

27 Claims, 3 Drawing Sheets

METHOD FOR ENABLING COMPREHENSIVE PROFILING OF GARBAGE-COLLECTED MEMORY SYSTEMS

This application incorporates-by-reference the computer program listing submitted on two compact discs, entitled "Copy 1" and "Copy 2." Each compact disc contains one 7,952-byte file, entitled "Compact Disc File.txt," created on Jun. 14, 2007.

FIELD OF THE INVENTION

The present invention relates to computer software, and more specifically to enabling comprehensive profiling of garbage-collected memory systems.

BACKGROUND OF THE INVENTION

Despite the rapid growth in memory sizes of computers, storage in which data is placed in a computer requires careful conservation and recycling. Some programming languages support static allocation of storage space while others support dynamic allocation. Static allocation connotes that storage space is determined at compilation of the computer program. In the case of dynamic allocation, storage space is determined during execution of the programs, known as "run-time". The area of dynamic memory reserved for storage space that is determined at run-time is a referred to as a "heap".

Many programming languages place the responsibility with the programmer to explicitly allocate storage and explicitly dispose or free that storage when it is no longer needed. Thus, when the programmer has the responsibility of the allocating and recycling or reclaiming of storage in dynamic memory, the memory management is said to be manually performed or "explicit".

An individually allocated piece of memory in the heap may be referred to herein as an "object". The goal is to dispose of unused or dead objects by freeing such objects and returning the space associated with such objects to the "free list" or "free pool". The "free list" or "free pool" is the set of unallocated usable spaces in the heap. However, with explicit allocation and deallocation, some objects cannot be deallocated or used because they have become "unreachable". The space occupied by an unreachable object is said to have "leaked" away. In addition, explicit deallocation may result in "dangling references". To illustrate, consider the following.

Data that is dynamically allocated in memory is usually accessible by the user program through the roots of the computation of the user program, or by following chains of pointers ("references") from these roots. The roots of the computation of a user program are those locations that hold values that a user program can manipulate directly. Processor registers and the program stack are examples of roots of the computation. Thus, an object in the heap is said to be "live" if its address is held in a root, or there is a reference to it held in another live object in the heap. Otherwise, the object is said to be "dead". An object becomes unreachable when the last reference to the object is destroyed before the object is deallocated. The object is no longer live if there are no references to it. In addition, such an object cannot be freed (deallocated) because it is unreachable, as there are no references leading to it. Objects that are neither live nor free cannot be used or recycled by explicit allocation and deallocation, and are called "garbage". Thus, unreachable dead objects are "garbage".

"Dangling references" occur when an object in the heap is deallocated while there are still references to the object. Dangling references can produce incorrect results. For example, if the memory location of the object that was deallocated while there were still references to it is reallocated to another of the user program's data structures, then the same memory location would represent two different objects.

Automatic dynamic memory management can obviate the problem of unreachable objects and dangling references. In one approach, automatic dynamic memory management involves assigning the responsibility for dynamic memory management to the program's run-time system. The programmer must still request dynamically allocated storage to be reserved but the programmer no longer needs to recycle the storage because the recycling is done automatically through a process called garbage collection. Garbage collection can recover unreachable objects by returning the space associated with such objects to the free list or free pool. In addition, garbage collection avoids dangling references by not deallocating any object while there remains references to it from other live objects.

Figure 1:
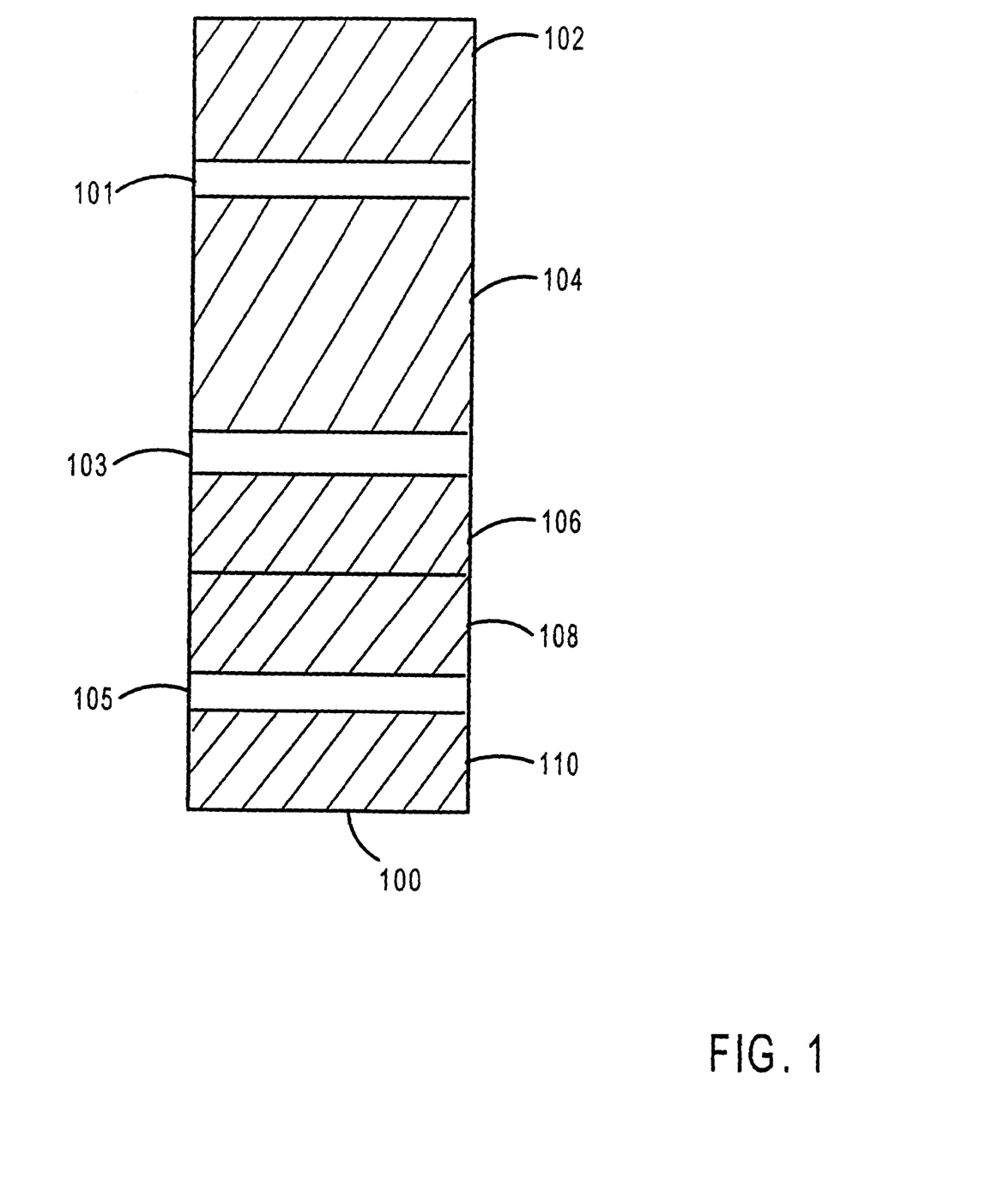
FIG. 1 is a block diagram illustrating fragmentation of a heap.

Furthermore, garbage collection may be useful in correcting the problem of "fragmentation". Fragmentation occurs in the course of allocating objects of different sizes in the heap. There are various strategies for choosing the optimum space in the heap to allocate to an object. However, such strategies usually result in areas or "fragments" of free pool in the heap. Sometimes the fragments are too small to be useful and are not contiguous and therefore, cannot be combined. For example, FIG. 1 illustrates a heap 100. The shaded areas 102, 104, 106, 108, 110 indicate storage space already in use in heap 100. The non-shaded areas, 101, 103, 105 indicate fragments of free pool in heap 100. Assume that none of the fragments of free pool are large enough to meet the current request for allocation of an object. Even though the free pool is not empty, an object cannot be allocated in the heap if none of the fragments are large enough. Thus, garbage collection can be employed to reclaim storage space not just when the "free-pool" is empty but also to automatically perform compaction of the heap storage space that is in use.

Garbage collection is one of many features associated with profiling a given user program such as an application program. "Profiling" describes the monitoring and tracing of events that occur during run-time. For example, a profiling tool may provide information on how much or how frequently dynamic memory is allocated by each portion of the executing application program. As will be explained in greater detail, some of the dynamic memory allocation information can be extracted from the object allocation process and the garbage collection process.

In one approach, profiling tools are specifically customized and instrumented for a specific platform. Typically, tool vendors specialize in providing tools that are only suitable for certain platforms. For example, different virtual machine vendors provide myriad Java™ virtual machine implementations. Java™ is an object-oriented language, the source code files of which are compiled into a format called bytecode. Bytecode can be executed on any machine on which Java run-time system software is installed. The Java™ run-time system is known as a Java™ virtual machine, a self-contained operating environment that behaves as if it is a separate computer. The Java™ virtual machine translates the bytecode's set of instructions into the underlying computer processor's set of instructions. Thus, a Java™ application will execute in any Java™ virtual machine regardless of the hardware and software underlying the system. It would be highly desirable if users were given the choice of using any profiling tool that is available in the market without worrying if the tool is compatible with the user's particular implementation of Java™ virtual machine.

Based on the foregoing, it is desirable to develop a mechanism that supports a wide variety of profiling tools for garbage collected memory systems.

SUMMARY OF THE INVENTION

A method and system are provided for allowing a profiler to communicate with a virtual machine without regard to the specific implementation of the virtual machine. A wide variety of profilers can be accommodated by using a set of virtual machine profiler interface events that are designed to be independent of any method for dynamically managing storage allocation and deallocation in a heap within the virtual machine process. The profiler may request specific information with respect to storage allocation and or deallocation in the heap. In response, the virtual machine can send the requested information using the virtual machine profiler interface events.

In other aspects, the invention encompasses a computer apparatus, a computer-readable medium, and a carrier wave configured to carry out the foregoing techniques.

Many other aspects and features will become apparent from the following description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for enabling comprehensive profiling of Java™ virtual machines are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Although certain embodiments have been described using the Java™ programming language, the present invention can be practiced on a variety of programming languages, and as such should not seen as limited to only the Java™ programming language.

Functional Overview

One embodiment of the invention is a general-purpose profiling interface between a virtual machine and the front-end of a profiler. The profiling interface is general enough to support a wide variety of profilers and virtual machine implementations. A general-purpose profiling interface offers at least two advantages over direct profiling support in the virtual machine implementation.

First, various profilers are not restricted to one format in presenting profiling information nor are they restricted in the types of profiling information they can present. For example, one profiler may simply record events that occur in the virtual machine trace file. Alternatively, another profiler may display information in response to interactive user input.

Another advantage of a general-purpose profiling interface is that a given profiler can be used with different virtual machine implementations, which support the same general-purpose profiling interface. This allows for profiling tool vendors and virtual machine vendors to leverage each other's products effectively.

Figure 2:
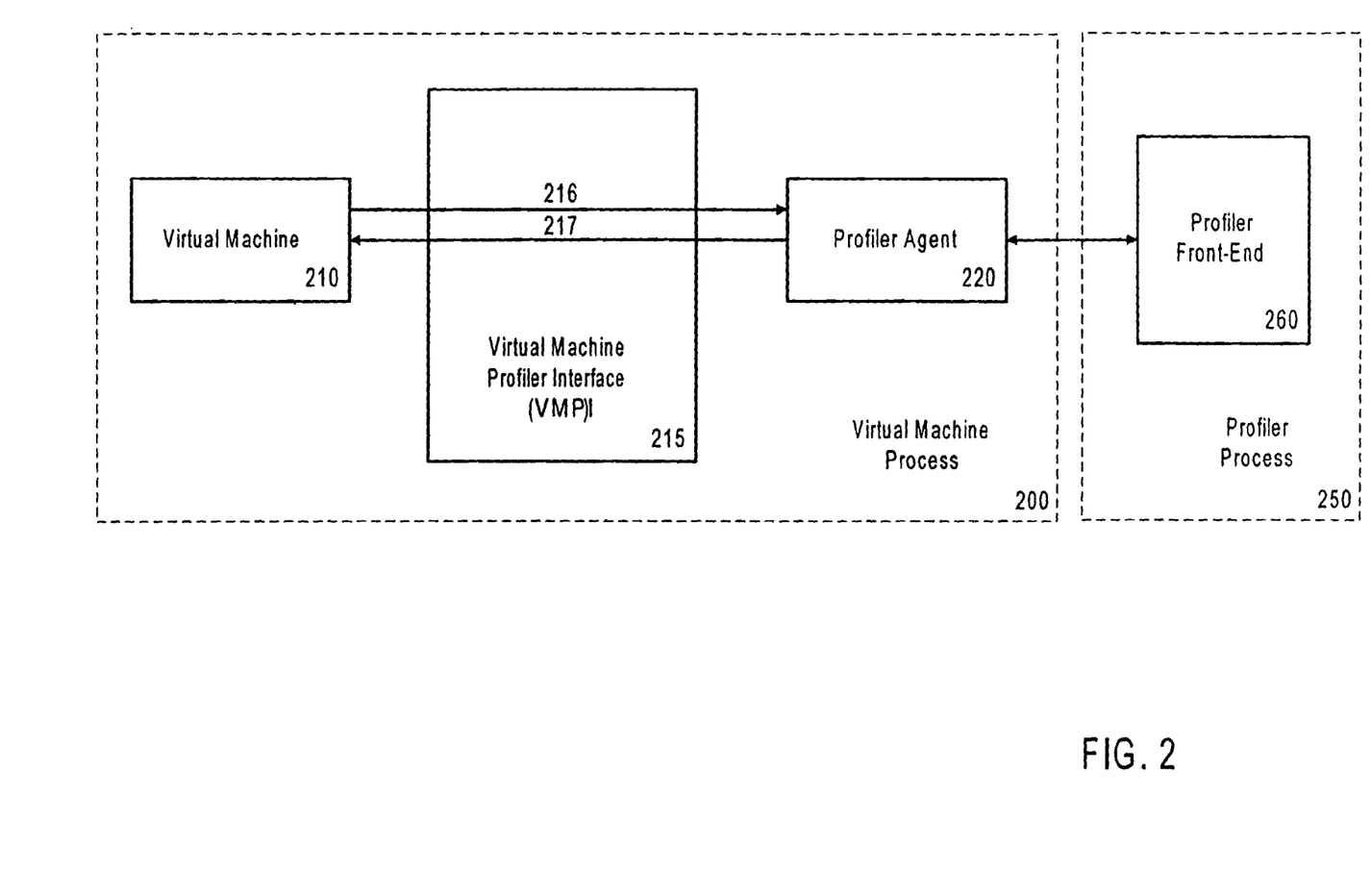
FIG. 2 is a block diagram illustrating a profiling architecture according to one embodiment of the invention.

FIG. 2 is a block diagram illustrating the overall profiler architecture according to one embodiment of the invention. The virtual machine profiler interface ("VMPI") 215 is interposed between the virtual machine 210 and the profiler agent 220. Typically, VMPI 215, virtual machine 210 and profiler agent 220 reside in a virtual machine process 200. Profiler agent 220 is responsible for communication between the VMPI 215 and a profiler front-end 260, which typically resides in a process that is separate from virtual machine process 200. In one embodiment of the invention, profiler front-end 260 resides in a profiler process 250, which is separate from virtual machine process 200 to ensure that the resources consumed by profiler front-end 260 are not attributed to the profiled user application. Specifications for an exemplary virtual machine profiler interface, "VMPI", for a Java™ virtual machine is attached hereto as Appendix A.

Profiler agent 220 can be programmed to delegate resource-intensive tasks to profiler front-end 260. Thus, even though profiler agent 220 runs on virtual machine process 200, profiler agent 220 does not overly distort the profiling information on the user application.

VMPI 215 is a two-way function call interface between virtual machine 210 and profiler agent 220. Typically, profiler agent 220 is implemented as a dynamically loaded library. Virtual machine 210 makes VMPI function calls to inform profiler agent 220 about various events that occur during the execution of the user application program as indicated by an arrow 216 of FIG. 2. Profiler agent 220 responds by calling back into virtual machine 210, as indicated by an arrow 217 of FIG. 2, for the purpose of accomplishing one or more tasks. For example, based on the needs of profiler front-end 260, profiler agent 220 may disable or enable certain types of events ("VMPI events") as they are sent through VMPI 215. The following is an example of how virtual machine 210 and profiler agent 220 may use VMPI function calls in one embodiment of the invention.

Profiler agent 220 may register the types of events in which it is interested by calling VMPI function:
jint (*EnableEvent)(jint event_type, void *arg)
Alternatively, Profiler agent 220 may call the following VMPI function to request a particular type of event:
jint (*RequestEvent)(jint event_type, void *arg)
In response, virtual machine 210 may send an event that was requested by profiler agent 220 by calling the following VMPI function:
void (*NotifyEvent) (JVMPI_Event *event)
VMPI function calls are explained in greater detail in Appendix A.

In one embodiment of the invention, VMPI events may be data structures consisting of an integer indicating the VMPI event type, an identifier of the thread in which the VMPI event occurred, followed by information that is specific to the VMPI event. Examples of some VMPI events are:

VMPI_Event_GC_Start
VMPI_Event_GC_Finish

As an illustration, virtual machine 210 sends the VMPI_Event_GC_Start event before the start of garbage collection, and when garbage collection is completed, virtual machine 210 sends the VMPI_Event_GC_Finish event. These and other VMPI events are explained in greater detail in Appendix A.

Allocation and Garbage Collection Events

In one embodiment of the invention, VMPI 215 is a flexible and yet comprehensive interface that uniformly accommodates a wide variety of memory allocation and garbage collection methods. Implicit in garbage collection methods are methods for memory allocation. Appendix A contains a detailed description of representative VMPI events. However, the focus is on the following set of profiling interface events that support all known types of garbage collection methods. Such profiling events are herein referred to as garbage collection algorithm-independent events since they support all known types of garbage collection methods and are further described in greater detail in Appendix A. These garbage collection algorithm-independent events may be used by virtual machine 210 to convey profiling information to profiler agent 220.

The abstract concept of a "heap arena" is used for describing allocation of new objects within the heap. A heap arena describes a logically partitioned portion of the heap. In one embodiment of the invention, all object allocations occur in a given heap arena even when there are a plurality of arenas. After the objects are allocated, they may be moved from one heap arena to another as explained below. To help explain the set of events, each event is described by its components. The first component is the event-type. The second component is the event-specific information contained in a pair of parentheses following the event-type.

new_arena (arena ID)
delete_arena (arena ID)
new_object (arena ID, object ID, class ID)
delete_object (arena ID)
move_object (old arena ID, old object ID, new arena ID, new object ID)

For example, "new_arena" is the event type and "arena ID" is the corresponding event-specific information. The virtual machine interface refers to entities in the virtual machine by various types of IDs. Threads, classes, methods, objects, heap arenas all have unique IDs. The subject of IDs is further detailed in Appendix A. In brief, each ID has a defining event and an undefining event. A defining event provides information related to the ID. For example, the defining event for an "object ID" contains, among other entries, the class ID of the object. The defining event for an object ID is "object allocate". The object ID remains valid until one of its undefining events arrive. The undefining events for an object ID are as follows:

The "object free" event, which invalidates an object ID.
The "object move" event, which signifies that the object still exists but its ID is changed, and or that it may have been moved to another heap arena.
The "arena delete" event, which invalidates all remaining object IDs in the heap arena.

When an object ID is invalidated either by an "object free" event or an "arena delete" event, the object is said to be "garbage collected".

Virtual machine 210 sends a "new arena" event to profiler agent 220 via VMPI 215 when a new heap arena for allocating objects is created. In one embodiment of the invention, the "new_arena" event may be described as follows in a Java™ virtual machine implementation.

Struct {
jint arena_id;
char *arena_name;
} new_arena;

The "arena_id" is the ID assigned to the new heap arena, and "arena_name" is the name of the new heap arena.

Similarly, virtual machine 210 sends a "delete_arena" event to profiler agent 220 through VMPI 215 when freeing all the objects remaining in the particular heap arena. Thus, profiler agent 220 is apprised of which objects remain in the heap arena by keeping track of the object allocations in the heap arena as well as the movement of objects in and out of the heap arena. In one embodiment of the invention, the "delete_arena" event may be described as follows in a Java™ virtual machine implementation. Note that the arena_id is the ID of the heap arena being deleted.

Struct {
jint arena_id;
} delete_arena;

Virtual machine 210 sends to profiler agent 220 a "new_object" event, also known as an "object_allocate" event when an object is allocated, or when profiler agent 220 requests such an event. In one embodiment of the invention, the "object_allocate" event may be described as follows in a Java™ virtual machine implementation.

Struct {
jint arena_id;
jobjectID class_id;
jint is_array;
jint size;
jobjectID obj_id;
} obj_alloc;

"Arena_id" identifies the heap arena where the objects are to be allocated. "Class_id" either identifies the class to which the object that are to be allocated belong, or the array element class is the "is_array" has a value of "JVMPI_Class". The "is array" can have values that indicate that it is a normal object, an array of objects, an array of Boolean expressions, etc. Further details may be found in Appendix A. "Size" is the number of bytes, and "obj_id" is the unique object ID.

Virtual machine 210 sends to profiler agent 220 a "delete_object" event, also known as an "object_free" event when an object is freed. In one embodiment of the invention, the "object_free" event may be described as follows in a Java™ virtual machine implementation.

Struct {
jobjectID obj_id;
} obj_free;

"Obj_id" identifies the object being freed.

Virtual machine 210 sends to profiler agent 220 a "move_object" event, also known as an "object_move" event when an object is moved to a new location in the heap. In one embodiment of the invention, the "object_move" event may be described as follows in a Java™ virtual machine implementation.

Struct {
jint arena_id;
jobjectID obj_id;
jint new_arena_id;
jobjectID new_obj_id;
} obj_move;

"Arena_id" identifies the current heap arena where the object resides. "Obj_id" identifies the current object ID of the object to be moved. "New_arena_id" identifies the new heap arena to which the object is to be moved. "New_obj_id" is the new ID assigned to the object after it is moved.

The use of allocation and garbage collection events are described below in connection with various garbage collection methods, such as the Mark-and-Sweep garbage collector, the Mark-Compact garbage collector, the Two-Space Copying garbage collector, the Generational garbage collector, and the Reference-Counting garbage collector.

Profiling Information

The "new_arena" and "delete_arena" events, as in the case of Generational garbage collection, provide useful profiling information such as the number of generations of objects, which objects are most likely to die young, and the relative age of the objects.

The "new_object" and "delete_object" events provide profiling information such as when, which and how many objects are allocated and deleted, as well as information on the classes to which the objects belong.

The "move_object" event, as in the case of the Mark-Compact garbage collection, would provide profiling information such as how frequently compaction had to be performed and what are the associated costs. The frequent need for compaction may be a reflection of the unsuitability of the allocation scheme for the particular user program application. In the case of Generational garbage collection, the "move_object" provides information as to survivability of objects. The longer surviving objects are moved to older heap arenas (older generations).

The combination of all five events provide information on the number of live objects that the program is using at any given time. Such information is highly useful in profiling garbage-collected memory systems.

Mark-and-Sweep Garbage Collector

The invention may be used with a Mark-and-Sweep garbage collector. The Mark-and-Sweep collector is an automatic storage and reclamation tracing garbage collection technique. Whether an object is alive may be determined directly or indirectly. The indirect methods are also referred to as "tracing" methods. Direct methods require for each object in the heap that a record be maintained of all references to that object from other heap objects or roots. In contrast, indirect or tracing garbage collectors visit all reachable objects, starting from the roots of the computation and by following pointers. Thus, the objects that were not visited by the garbage collector are made available for recycling.

Under the Mark-and-Sweep method, objects are not reclaimed immediately after they become garbage, but remain unreachable and undetected until all available storage in the heap is exhausted. If a request is then made for storage space, useful processing is temporarily suspended while the garbage collector is called to sweep all currently unused objects from the heap back into the free-pool. The Mark-and-Sweep collector, being a tracing collector, relies on a global traversal of all live objects to determine which objects are available for reclamation. The traversal of the live objects is the "marking" phase and the reclamation of unused objects is the "sweep" phase. During the "marking" phase, a bit associated with each cell, known as the "mark-bit" is reserved for use by the mark-and-sweep collector. The collector uses the "mark-bit" to record if the object is reachable from the roots of the computation. The mark-bit is set as each reachable object is visited. During the "sweep" phase, the unmarked objects are returned to the free-pool.

When used in conjunction with the allocation and garbage collection events described above, the Mark-and-Sweep collector would issue a "new_object" event when allocating objects. Only one heap arena is needed. The collector sends a "delete_object" event when returning dead objects to the free-pool.

Mark-Sweep-Compact Garbage Collector

The invention may be used with a Mark-Compact garbage collector. Under the Mark-Compact scheme, in addition to marking live objects in the heap, objects are relocated within the heap and the values of pointers that referred to the relocated objects are updated. The marked (live) objects are relocated in order to compact the heap. At the end of the compaction phase, the heap will be divided into two contiguous areas. One area will hold the active or live objects while the other area will hold the free-pool. There are several schemes related to the placement of the relocated objects in the heap. For example, under the "arbitrary" scheme, the live objects may be relocated without regard for their original order, or whether they point to one another. However, such a scheme often leads to reduced virtual memory performance. Under the "linearizing" scheme, live objects that originally pointed to one another are moved into adjacent positions. Under the "sliding" scheme, live objects are slid to one end of the heap.

When used in conjunction with the allocation and garbage collection events described above, the Mark-Compact collector would issue a "new_object" event when allocating objects and a "delete_object" event when returning dead objects to the free-pool. In addition, the collector would issue a "move_object" event in order to perform compaction of the heap. Only one heap arena is used in this case because the old and new heap arena IDs in the "move_object" event are the same. In this case, the relocation of the live objects can be viewed as simply reshuffling the positions of the live objects within the same area. Thus, there is no need for the abstraction of separate multiple heap arenas.

Two-Space-Copying Garbage Collector

The invention may be used with a Two-Space-Copying garbage collector. The Two-Space-Copying collector is tracing collector. Under the Two-Space-Copying scheme, the collector first divides the heap equally into two semi-spaces before any allocation of objects is performed. Allocation of objects occurs only in one of the semi spaces, referred to herein as the "Fromspace". The other semi space, referred to herein as the "Tospace", is reserved for later use. When garbage collection begins, the collector traverses the live objects in the "Fromspace" and copies each live object to the "Tospace". After all the live objects in the "Fromspace" have been traced, a replica of the live objects has been created in the "Tospace", and the user application program is restarted. The garbage objects are abandoned in the "Fromspace". The collector is said to "scavenge" the live objects from amidst the garbage.

When used in conjunction with the allocation and garbage collection events described above, the Two-Space-Copying collector would issue two "new_arena" events to create two heap arenas representing the two semi-spaces. The collector would issue a "new_object" when allocating objects. During garbage collection, the collector would issue "move_object" events as it scavenges the live objects for placement into the reserved heap arena. Once all the live objects have been scavenged from the old heap arena, the collector sends a "delete_arena" event to delete the old heap arena and thereby freeing all the objects in the old heap arena. Next, in order to restore the two-space scheme, the collector would issue a "new_arena" event using the same arena_id as the old heap arena that was deleted.

Generational Garbage Collector

The invention may be used with a Generational garbage collector. Under the Generational garbage collection scheme, objects are segregated by age into two or more regions of the heap called generations. Different generations can then be garbage collected at different frequencies, with the youngest generation being collected more frequently than the older generations. Objects are first allocated in the youngest generation, but are promoted into older generations if they survive long enough.

When used in conjunction with the allocation and garbage collection events described above, the Generational collector would issue a "new_arena" event to create an heap arena for each generation of objects. In addition, the Generational collector would issue a "new_object" to allocate objects in the youngest generation. The collector would issue a "move_object" event as live objects are scavenged from a younger generation to an older generation. All objects (garbage) in an heap arena are implicitly freed when the collector sends a "delete_arena" event to delete the youngest generation at any given time.

Next, in order to restore the generational scheme, the collector would issue a "new_arena" event using the same arena-id as the youngest generation that was deleted.

Reference-Counting Garbage Collector

The Reference-Counting garbage collector is a direct method of storage reclamation. Under the Reference-Counting scheme, each object has a reference count field used for counting the number of references to the object from other live objects or roots. Free objects have a reference count of zero. When a new object is allocated from the free-pool, its reference count is set to one. Each time a pointer is set to refer to an object, the value of the object's counter is increased by one. Likewise, when a reference to an object is deleted, the object's counter is decreased by one. When an object's counter drops to zero, there are no more pointers to the object and the object becomes garbage.

When used in conjunction with the allocation and garbage collection events described above, the Reference-Counting collector sends a "new_object" event each time an object is allocated, and it sends a "delete_object" event when the reference count of an object drops to zero.

Implementation Mechanisms

A. Overview

The approach described herein for comprehensive profiling of Java™ virtual machines may be implemented in computer software, in hardware circuitry, or as a combination of computer software and hardware circuitry. Accordingly, the invention is not limited to a particular computer software or hardware circuitry implementation.

The present invention is both flexible and powerful enough to meet the needs of a wide variety of virtual machine implementations and profiling tools. The invention's power lies in its provision for capturing the behavior of memory systems of the virtual machine using a set of events that are independent of any underlying garbage collection algorithm that has been implemented in the virtual machine.

Although certain embodiments have been described using the Java™ programming language, the present invention can be practiced on a variety of programming languages, and as such should not seen as limited to only the Java™ programming language.

B. Implementation Hardware

Figure 3:
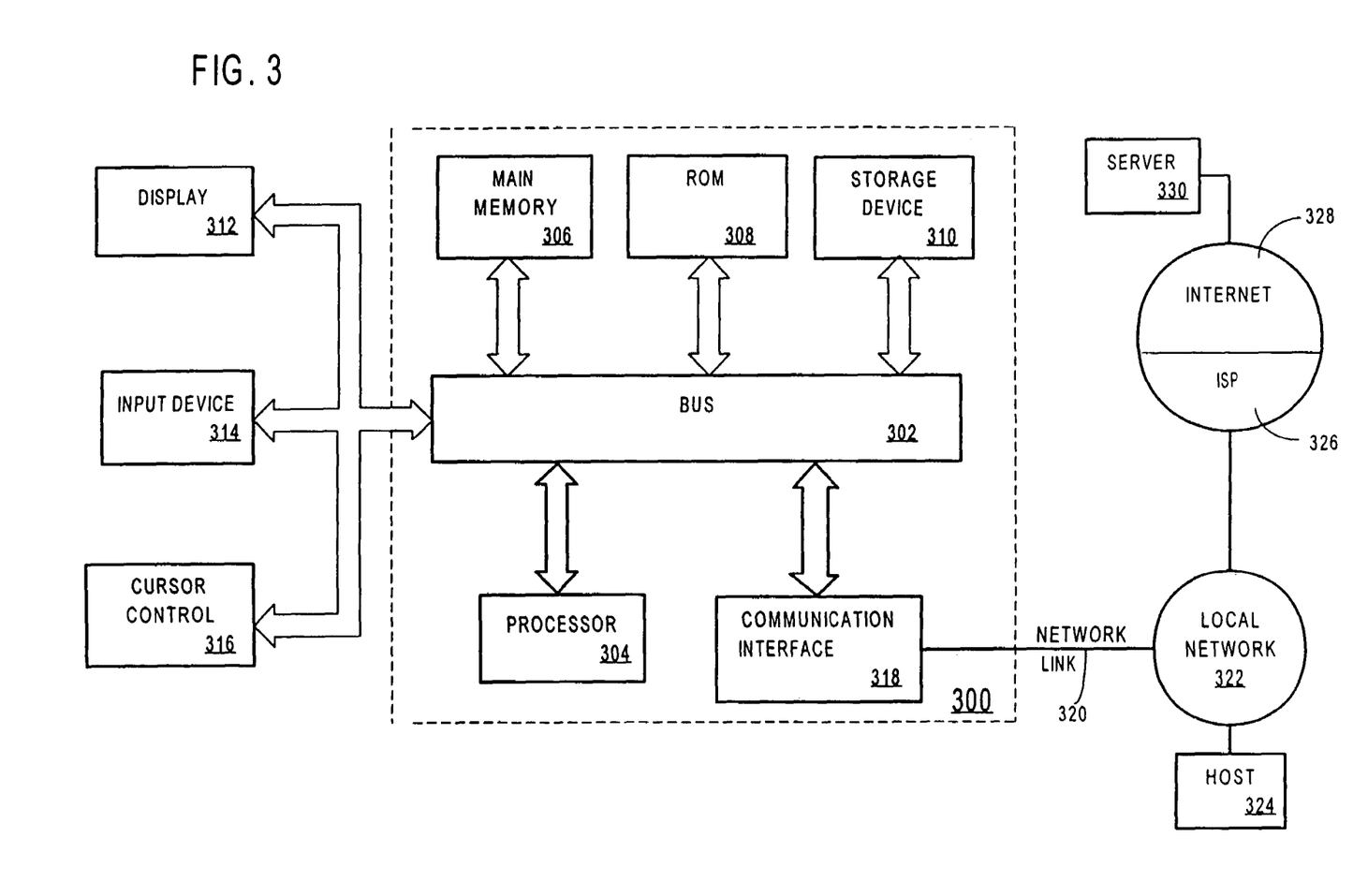
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing comprehensive profiling of Java™ virtual machines. According to one embodiment of the invention, implementing comprehensive profiling of Java™ virtual machines is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for implementing comprehensive profiling of Java™ virtual machines as described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allowing a profiler to communicate with a virtual machine without regard to a specific implementation of the virtual machine, the method comprising the steps of:

creating one or more heap arenas in a heap; and using at least one event to dynamically manage storage allocation and storage deallocation in the heap, wherein said at least one event is independent of any algorithm for dynamically managing storage allocation and storage deallocation in the heap.

2. The method of claim 1, wherein the one or more heap arenas represent one or more logically partitioned portions in the heap.

3. The method of claim 1, further comprising assigning a unique arena ID to each heap arena.

4. The method of claim 1, further comprising at least one step of the following steps:

using a new_arena event when a new heap arena is created;

using a delete_arena event with respect to a particular heap arena when all objects within a logically partitioned portion of the heap represented by the particular heap arena have been deleted;

using one or more new_object events when one or more new objects are allocated in the new heap arena;

using one or more delete_object events when one or more dead objects are returned to a free pool in the heap; and using one or more move_object events when one or more objects are moved from one heap arena to another heap arena.

5. The method of claim 4, further comprising associating each object with a unique arena ID, a unique object ID, and a unique class ID.

6. The method of claim 1, further comprising:

initiating a new_arena event to create a new heap arena to represent a logically partitioned portion of the heap;

initiating one or more new_object events when one or more new objects are allocated in the new heap arena; and initiating one or more delete_object events when one or more dead objects are returned to a free pool in the heap.

7. The method of claim 1, further comprising:

initiating a new_arena event to create a new heap arena to represent a logically partitioned portion of the heap;

initiating one or more new_object events when one or more new objects are allocated in the new heap arena;

initiating one or more move_object events when the heap is compacted; and initiating one or more delete_object events when one or more dead objects are returned to a free pool in the heap.

8. The method of claim 1, further comprising:

initiating two new_arena events to create a first and second heap arena to represent a corresponding first and second logically partitioned portions in the heap;

initiating one or more new_object events when one or more new objects are allocated in the first heap arena;

initiating one or more move_object events when one or more live objects are moved from the first heap arena to the second heap arena; and initiating a delete_arena event with respect to the first heap arena when all objects within the first logically partitioned portion of the heap represented by the first heap arena have been deleted.

9. The method of claim 1, further comprising:
initiating two or more new_arena events to create a plurality of heap arenas to represent a corresponding plurality of logically partitioned portions in the heap;
initiating one or more new_object events when one or more new objects are allocated in a youngest heap arena corresponding to a youngest logically partitioned portion of the heap;
initiating one or more move_object events when one or more objects are moved from a younger heap arena to an older heap arena; and
initiating a delete_arena event with respect to the youngest heap arena when all the objects within the youngest logically partitioned portion of the heap represented by the youngest heap arena have been deleted.

10. A computer-readable medium carrying one or more sequences of one or more instructions for allowing a profiler to communicate with a virtual machine without regard to a specific implementation of the virtual machine, the one or more sequences of one or more instructions including instructions which, when executed by one or more processors, cause the one or more processors to perform the steps of:
creating one or more heap arenas in a heap; and
using at least one event to dynamically manage storage allocation and storage deallocation in the heap, wherein said at least one event is independent of any algorithm for dynamically managing storage allocation and storage deallocation in the heap.

11. The computer-readable medium of claim 10, wherein the one or more heap arenas represent one or more logically partitioned portions in the heap.

12. The computer-readable medium of claim 10, further comprising assigning a unique arena ID to each heap arena.

13. The computer-readable medium of claim 10, further comprising at least one step of the following steps:
using a new_event when a new heap arena is created;
using a delete_arena event with respect to a particular heap arena when all objects within a logically partitioned portion of the heap represented by the particular heap arena have been deleted;
using one or more new_object events when one or more new objects are allocated in the new heap arena;
using one or more delete_object events when one or more dead objects are returned to a free pool in the heap; and
using one or more move_object events when one or more objects are moved from one heap arena to another heap arena.

14. The computer-readable medium of claim 13, further comprising associating each object with a unique arena ID, a unique object ID, and a unique class ID.

15. The computer-readable medium of claim 10, further comprising:
initiating a new_arena event to create a new heap arena to represent a logically partitioned portion of the heap;
initiating one or more new_object events when one or more new objects are allocated in the new heap arena; and
initiating one or more delete_object events when one or more dead objects are returned to a free pool in the heap.

16. The computer-readable medium of claim 10, further comprising:
initiating a new_arena event to create a new heap arena to represent a logically partitioned portion of the heap;
initiating one or more new_object events when one or more new objects are allocated in the new heap arena;
initiating one or more move_object events when the heap is compacted; and
initiating one or more delete_object events when one or more dead objects are returned to a free pool in the heap.

17. The computer-readable medium of claim 10, further comprising:
initiating two new_arena events to create a first and second heap arena to represent a corresponding first and second logically partitioned portions in the heap;
initiating one or more new_object events when one or more new objects are allocated in the first heap arena;
initiating one or more move_object events when one or more live objects are moved from the first heap arena to the second heap arena; and
initiating a delete_arena event with respect to the first heap arena when all objects within the first logically partitioned portion of the heap represented by the first heap arena have been deleted.

18. The computer-readable medium of claim 10, further comprising:
initiating two or more new_arena events to create a plurality of heap arenas to represent a corresponding plurality of logically partitioned portions in the heap;
initiating one or more new_object events when one or more new objects are allocated in a youngest heap arena corresponding to a youngest logically partitioned portion of the heap;
initiating one or more move_object events when one or more objects are moved from a younger heap arena to an older heap arena; and
initiating a delete_arena event with respect to the youngest heap arena when all the objects within the youngest logically partitioned portion of the heap represented by the youngest heap arena have been deleted.

19. A system for profiling a heap, the system comprising:
a memory;
one or more processors coupled to the memory; and
at least one processor configured to:
create one or more heap arenas in a heap; and
use at least one event to dynamically manage storage allocation and storage deallocation in the heap, wherein said at least one event is independent of any algorithm for dynamically managing storage allocation and storage deallocation in the heap.

20. The system of claim 19, wherein the one or more heap arenas represent one or more logically partitioned portions in the heap.

21. The system of claim 19, further comprising assigning a unique arena ID to each heap arena.

22. The system of claim 19, further comprising at least one step of the following steps:
using a new_arena event when a new heap arena is created;
using a delete_arena event with respect to a particular heap arena when all objects within a logically partitioned portion of the heap represented by the particular heap arena have been deleted;
using one or more new_object events when one or more new objects are allocated in the new heap arena;

using one or more delete_object events when one or more dead objects are returned to a free pool in the heap; and using one or more move_object events when one or more objects are moved from one heap arena to another heap arena.

23. The system of claim 22, further comprising associating each object with a unique arena ID, a unique object ID, and a unique class ID.

24. The system of claim 19, further comprising:

initiating a new_arena event to create a new heap arena to represent a logically partitioned portion of the heap;

initiating one or more new_object events when one or more new objects are allocated in the new heap arena; and initiating one or more delete_object events when one or more dead objects are returned to a free pool in the heap.

25. The system of claim 19, further comprising:

initiating a new_arena event to create a new heap arena to represent a logically partitioned portion of the heap;

initiating one or more new_object events when one or more new objects are allocated in the new heap arena;

initiating one or more move_object events when the heap is compacted; and initiating one or more delete_object events when one or more dead objects are returned to a free pool in the heap.

26. The system of claim 19, further comprising:

initiating two new_arena events to create a first and second heap arena to represent a corresponding first and second logically partitioned portions in the heap;

initiating one or more new_object events when one or more new objects are allocated in the first heap arena;

initiating one or more move_object events when one or more live objects are moved from the first heap arena to the second heap arena; and initiating a delete_arena event with respect to the first heap arena when all objects within the first logically partitioned portion of the heap represented by the first heap arena have been deleted.

27. The system of claim 19, further comprising:

initiating two or more new_arena events to create a plurality of heap arenas to represent a corresponding plurality of logically partitioned portions in the heap;

initiating one or more new_object events when one or more new objects are allocated in a youngest heap arena corresponding to a youngest logically partitioned portion of the heap;

initiating one or more move_object events when one or more objects are moved from a younger heap arena to an older heap arena; and initiating a delete_arena event with respect to the youngest heap arena when all the objects within the youngest logically partitioned portion of the heap represented by the youngest heap arena have been deleted.

* * * * *

UNITED STATES PATENT AND TRADEMARK OFFICE
CERTIFICATE OF CORRECTION

| | | |
|---|---|---|
| PATENT NO. | : 7,310,718 B1 | Page 1 of 1 |
| APPLICATION NO. | : 09/856779 | |
| DATED | : December 18, 2007 | |
| INVENTOR(S) | : Sheng Liang et al. | |

It is certified that error appears in the above-identified patent and that said Letters Patent is hereby corrected as shown below:

On the title page, item [60] col. 1, please insert

--Priority Application No. 60/109,945 filed November 25, 1998.--

Signed and Sealed this

Thirteenth Day of May, 2008

JON W. DUDAS
*Director of the United States Patent and Trademark Office*